Dec. 27, 1966          J. PETERSON          3,294,608

METHOD OF PRESTRESSING A WOOD BEAM

Filed Feb. 27, 1964          2 Sheets-Sheet 1

INVENTOR.
JOHN PETERSON
BY
ATTORNEYS

INVENTOR.
JOHN PETERSON
BY
ATTORNEYS

United States Patent Office 3,294,608
Patented Dec. 27, 1966

3,294,608
METHOD OF PRESTRESSING A WOOD BEAM
John Peterson, Madison, Wis., assignor to the United States of America as represented by the Secretary of Agriculture
Filed Feb. 27, 1964, Ser. No. 347,969
1 Claim. (Cl. 156—160)

A nonexclusive, irrevocable, royalty-free license in the invention herein described throughout the world for all purposes of the United States Government, with the power to grant sublicenses for such purposes, is hereby granted to the Government of the United States of America.

This invention relates to a method for prestressing a wood beam with a bonded tension element. More particularly, it relates to a method for prestressing simple or continuous, sawn or laminated wood members for the purpose of increasing their load carrying capacity.

The theory of prestressing is not new, having been applied to concrete for many years, although the extensive use of prestressed concrete is comparatively modern. Similarly, the reinforcement of timber is not new, although a technique for prestressing timber beams was not noted until 1955 when W. H. Willatts published his article, "Competitive Structural Trends," 20 Wood No. 2, 44–47 (1955). He suggested that a wood beam could be prestressed by the general method of application of an endwise, mechanical, compressive force. Willatts did not, as far as it known, reduce his theory to practice.

The advantages of prestressing may be illustrated quite simply. If a load is placed upon a conventional beam (in a horizontal position supported at the ends only with the load placed at the center, the load causes stresses to be set up in the beam as follows. As the center of the beam is forced downward, the resultant stress in the area near the upper surface of the beam is compression along a line parallel to the length of the beam. The resultant stress in the area near the lower surface of the beam is tension also along a line parallel to the length of the beam. To counter these load induced stresses, the beam may be prestressed such that when it is unloaded, tension is effected in the area near the upper surface and compression in the area near the lower surface, both stresses directed along a line parallel to the length of the beam. Thus, a substantially greater load is required to effect the same stresses in the prestressed beam as resulted in the conventional beam because a portion of the load in the prestressed beam is employed in offsetting the stresses produced by the prestressing process.

To produce this resultant longitudinal tension in the area of the beam near the upper surface and longitudinal compression near the lower surface, a compressive force, P, is applied at each end of the beam in such a manner as to give rise to a certain moment, $M_p$. The prestressing moment may be illustrated by the formula $M_p = Pe$ where $e$ is the distance from the centroid of the end of the beam to the point of application of the force P.

Accordingly, one object of this invention is the production and stabilization of a prescribed moment in a wood beam. Another object is to provide a prestressed wood beam which utilizes the maximum eccentricity available in a given beam thus making efficient use of all the compressive force brought to bear on the beam and inducing the greatest prestress moment possible by the application of a given force. Another object is to provide a method for constructing a prestressed beam without making internal changes in the wood, such as ducts or channels. An additional object is the reinforcement of the beam by the added strength of a sheet of high strength material bonded to the under surface.

These and other objects which will be apparent to those skilled in the art are achieved in accordance with the invention described below and in the accompanying drawings in which.

In general, in accordance with this invention, specially shaped members, herein denominated "shoes," of high strength metal are bonded to the ends of a flat, thin sheet of high strength material, herein denominated "tension element," forming a composite structure which is placed under tension by external forces applied to the shoes. While under tension, the composite structure is bonded securely to a surface of a solid sawn wood or glued laminated wood beam. When the bond has been secured, the external tensioning forces are released from the resultant composite structure; the resultant compression on the structure establishes stresses within the beam, viz—the aforedescribed prestress.

Figure 1:
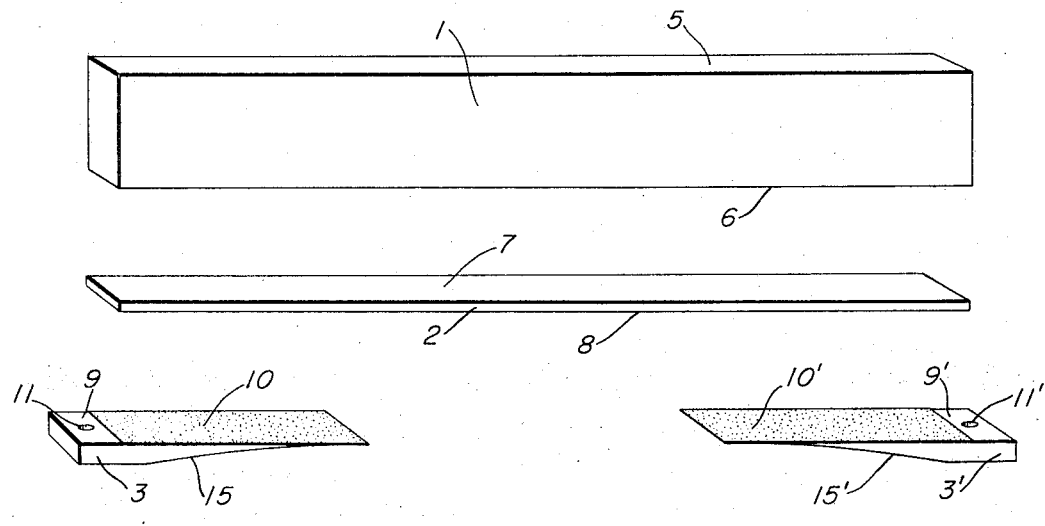
FIGURE 1 represents a side view of the structures in a disengaged relation, such structures being required for the fabrication of a prestressed wood beam in accordance with this invention.
Figure 2:
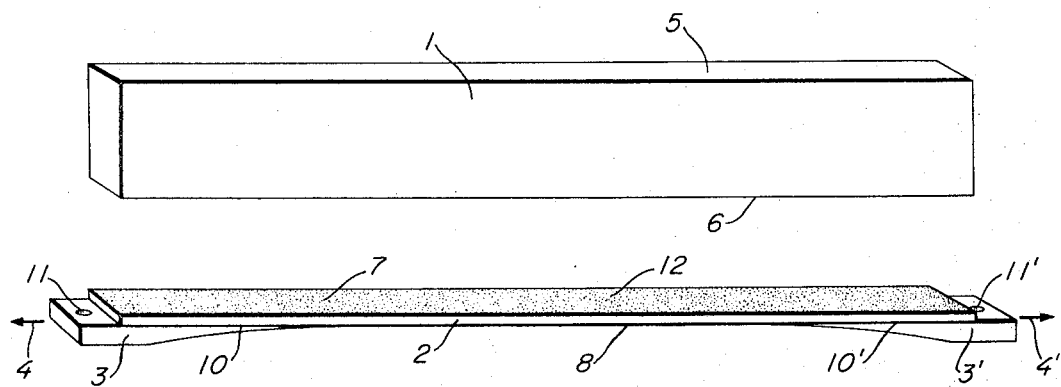
FIGURE 2 represents a similar view in which two of the structures have been united in the relationship required for the process herein described and stand in preparation for the completion of a prestressing process.
Figure 3:
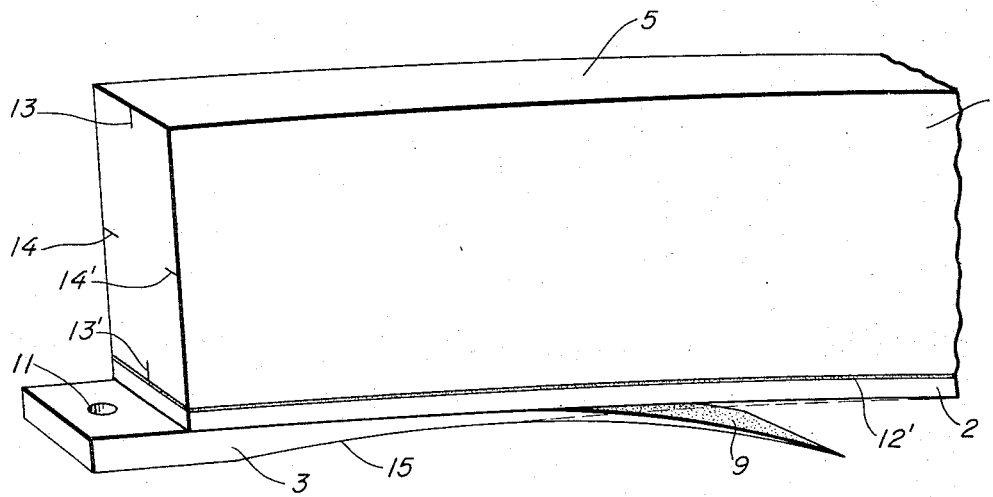
FIGURE 3 represents an enlarged view of one end of a wood beam undergoing the process herein described.
Figure 4:
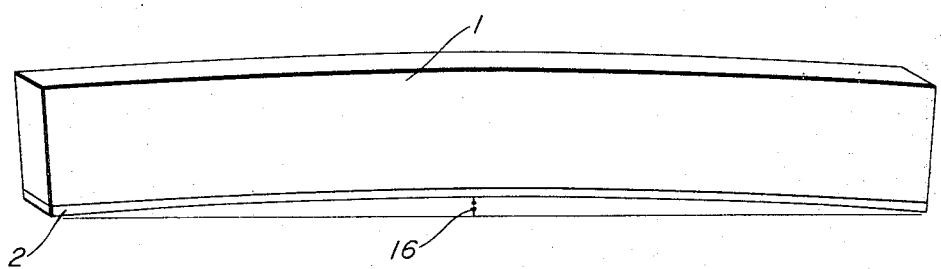
FIGURE 4 represents the completed prestressed wood beam.

Referring to FIGURE 1, a wood beam 1 with upper surface 5 and lower surface 6, a tension element 2 with upper surface 7 and lower surface 8, and shoes 3 and 3' with upper surfaces 9 and 9', lower surfaces 15 and 15', and holes 11 and 11', are represented as being disengaged but in the horizontal relationship required for completion of the prestressing process herein described. Thus, in accordance with this invention, the upper surfaces 9 and 9' of the shoes 3 and 3', respectively, are coated with a peel sensitive adhesive 10 and 10' and joined in the relationship indicated with the lower surface 8 of the tension element 2, the resultant bonded composite structure being disclosed in FIGURE 2. When the aforedescribed bond is secure, the composite structure is placed in tension, holes 11 and 11' being provided in the extending ends of the shoes 3 and 3' to provide for attachment to a force producing device, such force being produced essentially in the direction of the arrows 4 and 4'. Subsequent to the bonding and tensioning of the tension element and shoes in the aforedescribed manner, a permanent adhesive is applied to the upper surface 7 of the tension element 2, such adhesive being disclosed in FIGURE 2 by shaded area 12 on the upper surface 7 of the tension element 2, and to the lower surface 6 of the beam 1, and the beam is bonded to the composite structure in the disclosed relationship while the external tensioning force in the direction of the arrows 4 and 4' is maintained on the composite structure. When the bond 12 between the composite structure and the beam is secure, the external tensioning force in the direction of arrows 4 and 4' is released, and prestress is established within the beam. FIGURE 3 discloses one end of the beam after bonding to the tension element and after release of the aforedescribed external tensioning force on the shoes and indicates the process for removal of the shoe 3 which may be peeled from the tension element, provision for such removal having been made by the use of peel sensitive adhesive in the temporary bond between the tension element and the shoe. After removal, the shoes may be cleaned and reused. FIGURE 3 also discloses reference points 13, 13', 14 and 14'. The intersection of lines connecting reference points 13 and 13' and reference points 14 and 14' is the centroid of the beam. When the tension element is in place, this centroid is offset slightly toward the surface to which the tension element is attached, the amount of offset being dependent on the thickness of the tension element and its comparative stiffness in relation to the wood. The distance from the centroid of the prestressed beam to the center of the resultant compression on the end of the beam is the eccentricity, $e$. FIGURE 4 discloses the finished prestressed beam and indicates that a camber represented by line 16, here exaggerated, is effected in the unloaded, prestressed beam herein described. When the beam is subjected to the load for which it was designed, such camber disappears.

The strength and modulus of elasticity of the material used for the tension element and shoes, the size, strength, and modulus of elasticity of the wood beam, and the prestress desired establish the dimensions of the tension element and the dimensions and shape of the shoes. In the simple prestressed wood beam described above, the length and width of the tension element equal the length and width of the lower surface of the beam. The thickness of the tension element varies as stated above. The various relationships which establish the shape of the shoes is described below.

If external tensioning forces were established directly on the ends of the tension element, the likelihood of failure of the wood or the bond near the ends of the beam would be great because of the resultant high stresses induced in these end regions. In accordance with the present invention, it has been found that the application of the external tensioning force to the aforedescribed specially shaped shoes attached to the ends of the tension element effectively reduces the stress occurring in the end regions of the completed prestressed beam, thus decreasing the possibility of failure. The width of these shoes equals the width of the tension element and the length and depth of the shoes vary as follows. FIGURE 1 discloses that the upper surfaces 9 or 9' of the shoes 3 or 3' are flat. The lower surfaces 15 or 15' are essentially curves, the curvature of which are expressed by the formula $$h = t(1 - x/x)$$

where $t$ is the thickness of the tension element; $h$ is the thickness of the shoe at any point on the curved portion of the shoe; X is the distance from the end of the tension element to the point where $h$ is measured; and 1 is the length of the shoe excluding that extending beyond the end of the tension element. Applying the formula, it is clear that the thickness of the shoe will vary from infinitesimal to very large; to practically effect the purposes of the shoes, the formula is abandoned near that end of the shoe which will eventually be subjected to the external tensioning force. Thus, the lower surface of the shoe does not appear as being completely curved.

As indicated, the flat upper surfaces of the shoes are applied to the tension element such that thinnest end lies inwardly on the lower surface of the tension element. When the external tensioning force is applied to the shoes, the resultant force on the ends of the tension element is less than that effected toward the center of the tension element. When the beam is bonded to the tension element which is being subjected to tension applied in the manner herein described, and the external tensioning force is withdrawn, the resultant prestress in the beam is lesser near the ends of the beam, insuring that splitting of the ends of the beam will not occur, and greater toward the center of the beam where the load induced stress is likely to be highest.

From the foregoing, it is obvious that the method applied need not be confined to the prestressing of a simple beam. Where a beam is to be used in a situation in which it is to be supported at several points, the aforedescribed method of prestressing may be applied to any of the several different areas of the beam which are subjected to tension under service loads. Thus, the complex prestressed beam would have several tension elements applied in the manner descried to those areas under tension. The size of the tension elements would, of course, vary according to the situation, and tension elements of both large and small dimensions could be applied to the beam.

As a specific example, a Douglas-fir beam 18 feet long, 10.5 inches high and 5 inches wide was subjected to the prestressing process as follows. A tension element composed of type C1095 hardened and tempered spring steel 18 feet long, 5 inches wide, and .062 inch thick, was provided with shoes in the manner described above. Epoxy resin was used as the adhesive between the tension element and the shoes. The shoes were a combination of type C1095 hardened and tempered spring steel and type C1018 cold rolled steel, 64 inches long, 5 inches wide, and of a varying thickness consistent with the formula noted above. An external tensioning force of 47,000 lbs. was placed on this composite structure in the manner previously explained. The wood beam was bonded to composite structure while it was under tension. The adhesive was again epoxy resin. When the bond was secure, the external tensioning force was withdrawn, the shoes removed, and tests performed. It appeared that the prestressed beam could be subjected to a load 100 percent greater than that to which an unprestressed beam could be subjected, without exceeding the reasonable allowable working stress recommended by the West Coast Lumberman's Association. The load required to fail the prestressed beam was 30 to 40 percent greater than that required to fail an unprestressed beam.

I claim:

A method of producing a prestressed wood beam having established stresses directed along a line parallel to the length of the beam, comprising:

(a) providing an elongated wood beam, a tension element consisting of a flat, thin sheet of high-strength material equal in length and width to a surface of said beam, and a pair of tension-transmitting shoes;

(b) releasably bonding one of the shoes at each end of one side of the tension element with the ends of said shoes extending beyond the ends of said tension element;

(c) applying oppositely-directed forces to the extending ends of the shoes, thereby placing the tension element under tension, the forces being transmitted from the shoes to the tension element through, and uniformly distributed over, the releasably bonded areas, whereby said areas of said tension element are under lower unit tension than the remainder thereof;

(d) permanently bonding the other side of the tension element to the beam while maintaining the tension on said element until said bonding has been completed;

(e) removing the forces on the shoes, thereby causing the tension element to relax and prestress the beam, the ends of said beam being under lower unit stress than the remaining portions thereof; and (f) removing the shoes from the tension element.

References Cited by the Examiner

UNITED STATES PATENTS 2,039,398    5/1936    Dye _____ 52—223
3,167,882    2/1965    Abbott _____ 156—160

FOREIGN PATENTS 165,619    1955    Australia.

FRANK L. ABBOTT, *Primary Examiner.*

JOHN E. MURTAGH, *Examiner.*